United States Patent [19]

DeSanti

[11] Patent Number: 4,874,904
[45] Date of Patent: Oct. 17, 1989

[54] FIBER OPTIC FACEPLATE ASSEMBLY

[75] Inventor: Raymond J. DeSanti, Worcester, Mass.

[73] Assignee: Brintec Corporation, Williamantic, Conn.

[21] Appl. No.: 181,594

[22] Filed: Apr. 14, 1988

[51] Int. Cl.$^4$ .............................................. H02G 3/08
[52] U.S. Cl. ........................................ 174/53; 174/66; 350/96.2; 439/501; 439/536
[58] Field of Search ..................... 174/53, 54, 55, 56, 174/66; 439/501, 527, 528, 535, 536; 362/387; 350/96.1, 96.2

[56] References Cited

U.S. PATENT DOCUMENTS 4,669,802  6/1987  Schaffer ............................ 439/535
4,765,708  8/1988  Becker et al. ...................... 350/96.2

Primary Examiner—A. T. Grimley
Assistant Examiner—David A. Tone
Attorney, Agent, or Firm—McCormick, Paulding & Huber

[57] ABSTRACT

An outlet box having a frontal opening and faceplate assembly including an insert received within the outlet box and defining a forwardly opening bore and a faceplate mounted on the outlet box and forming a closure for the frontal opening. A fiber optic bulkhead connector is mounted on the faceplate for coupling to an elongated optical fiber, a portion of which is stored in coiled condition within the bore. When the faceplate is removed from the outlet box, the coiled portion of the fiber allows the faceplate to be moved a substantial distance from the outlet box for access to the coupled connection between the optical fiber and the bulkhead connector without subjecting the fiber to excessive bending stress.

15 Claims, 1 Drawing Sheet

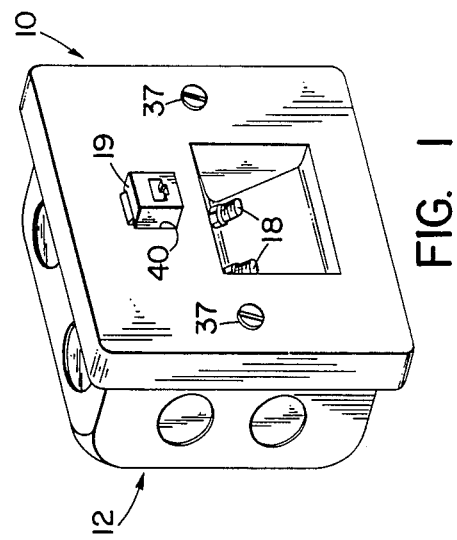
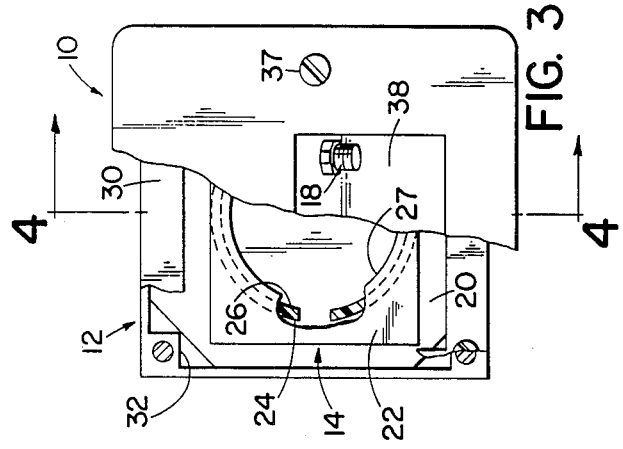
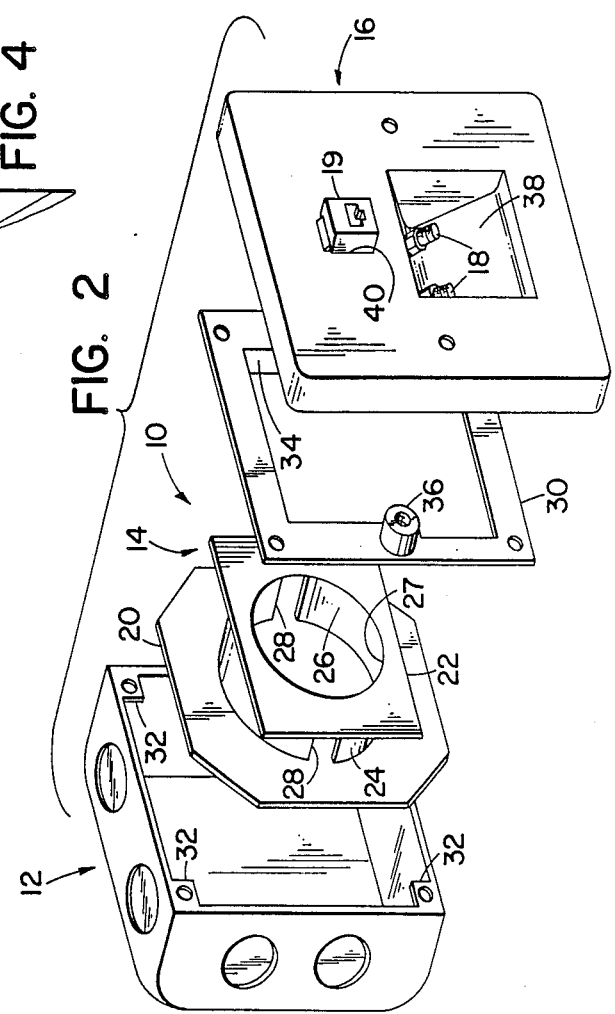
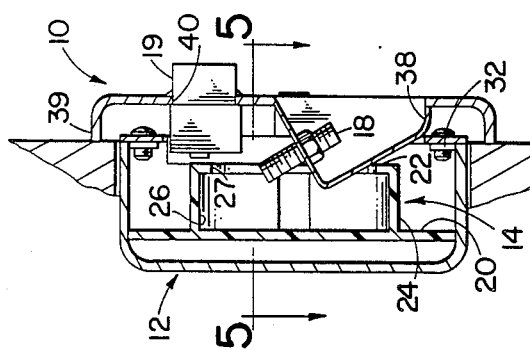
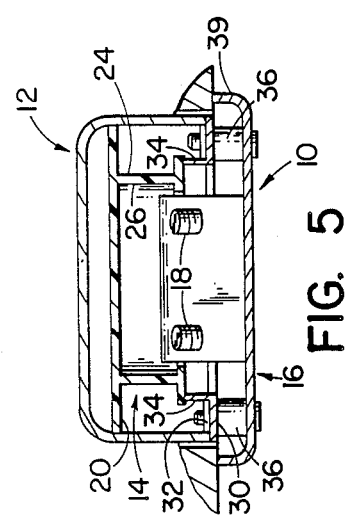

FIBER OPTIC FACEPLATE ASSEMBLY

BACKGROUND OF THE INVENTION

This invention relates in general to faceplates for wall outlet boxes and the like and deals more particularly with an improved faceplate assembly for outlet termination of one or more optical fibers.

A conventional fiber optic faceplate assembly usually has one or more bulkhead connectors for terminating optical fibers within an associated wall outlet box or the like to facilitate external connection to transmitting or receiving apparatus. Customarily, each optical fiber is terminated by a connector attached to its terminal end for coupling engagement with the inner end of an associated bulkhead connector mounted on the faceplate. The elongated fiber allows the faceplate to be removed from an associated outlet box and moved to and held in a position a substantial distance from the wall outlet box to enable the connector associated with the fiber to be coupled to or uncoupled from the bulkhead connectors without exposing the optical fiber to excessive bending stress. However, when the faceplate assembly is mounted on the outlet box the optical fiber must be coiled or otherwise arranged for storage within the outlet box. Care must be exercised in coiling or otherwise positioning the optical fiber within the wall outlet box to avoid exposing the fiber to excessive bending stress.

The present invention is concerned with the aforedescribed general problem. Specifically, it is a general aim of the present invention to provide an improved fiber optic faceplate assembly which includes means for storing one or more optical fibers in coiled condition and which enables the fiber or fibers to be rapidly moved into and removed from storage position within an associated wall outlet box without subjecting the individual optical fibers to excessive stress. A further aim of the invention is to provide an improved faceplate assembly for terminating a hybrid cable containing one or more optical fibers and one or more electrical conductors.

\MARY OF THE INVENTION

A .         c faceplate assembly for an outlet box havin₁      ' opening, has a faceplate for attachment to the        x to provide a closure for the frontal opening and a fiber optic bulkhead connector mounted in fixed position on the faceplate. The faceplate assembly further includes insert means for positioning within the outlet box and defining a forwardly opening bore for receiving and storing in coiled condition an elongated portion of at least one optical fiber coupled to the bulkhead connector, and means for releasably attaching the faceplate to the outlet box.

BRIEF DESCRIPTION OF THE DRAWINGS

FIG. 1 is a perspective view of a faceplate assembly embodying the present invention shown mounted on a wall outlet box.

FIG. 2 is an exploded view of the faceplate assembly and outlet box shown in FIG. 1.

FIG. 3 is a somewhat enlarged front elevational view of the faceplate assembly and wall outlet box shown with a portion of the faceplate broken away to reveal structure therebehind.

FIG. 4 is a sectional view taken along the line 4-4 of FIG. 3.

FIG. 5 is a sectional view taken along the line 5-5 of FIG. 4.

DETAILED DESCRIPTION OF PREFERRED EMBODIMENT

Referring now to the drawings, a fiber optic faceplate assembly embodying the present invention and indicated generally by the reference numeral 10 is shown mounted on a conventional wall outlet box indicated generally at 12. The outlet box which has a frontal opening and a plurality of conventional knock-out portions for selective removal to expose cable receiving apertures. The faceplate assembly 10 is particularly adapted to terminate a hybrid cable which contains both optical fibers and electrical conductors and essentially comprises an insert indicated generally at 14 for positioning within the outlet box, a faceplate designated generally by the numeral 16, and one or more fiber optic bulkhead connectors 18,18 mounted on the faceplate. The faceplate assembly 10 also includes a modular electrical connector 19 mounted on the faceplate 16 for terminating one or more electrical conductors which may comprise part of such a hybrid cable. The insert defines a racetrack for storing in a coiled condition an elongated portion of at least one optical fiber (not shown) terminated by an associated bulkhead connector 18. The coiled portion of the optical fiber allows the faceplate to be moved to and held in a convenient position spaced a substantial distance from the outlet box to enable access to the connection between the optical fiber and the bulkhead connector 18 mounted on the faceplate when the faceplate is removed from the outlet box 12, all of which will be hereinafter more fully discussed.

Considering now the faceplate assembly 10 in further detail, the insert 14 may be made of any suitable material, but preferably it is molded from dielectric plastic material and has a generally rectangular rear wall 20, a generally rectangular front wall 22 and a generally cylindrical tubular wall 24 integrally connected to and extending between the rear wall and the front wall. The cylindrical wall 24 has a generally cylindrical forwardly opening bore which defines a racetrack 26 of at least 3 inch (2.54 cm) diameter. Preferably, the racetrack 26 is capable of receiving and storing a 36 inch (91.44 cm) length of optical fiber. A coaxial circular aperture or opening 27 of somewhat smaller diameter opens through the front wall 22 and communicates with the bore 26. Slots 28,28 open through the cylindrical wall 24 at generally diametrically opposite positions and extend between the rear and front walls 20 and 22 to provide communication between the interior of the outlet box 12 and the bore or racetrack 26.

The insert 14 is retained within the outlet box 12 by a frame which may comprise an integral part of the insert. However, in the illustrated embodiment 10 the frame, indicated by the numeral 30, comprises a separate part for mounting on the outlet box 12 in overlying relation to fastener receiving tabs 32,32 integrally connected to the walls of the outlet box substantially as shown in FIGS. 2 and 3. The frame 30 has opposing inwardly directed side wall positions 34,34 which, in assembly with the outlet box, bear upon the front wall 22 to retain the insert in a predetermined fixed position within the outlet box 12. Internally threaded bosses 36,36 mounted on the frame 30 receive fasteners 37,37 which releasably secure the faceplate 16 to the outlet box.

The faceplate 16 may be made from any suitable material and is preferably generally rectangular to generally complement the shape of the outlet box and provide a closure for it. A rearwardly directed integral peripheral wall 39 surrounds the faceplate, as best shown in FIGS. 4 and 5, for engaging the surface of a wall in which the outlet box 12 is mounted. An indentation or outwardly opening recess 38 is preferably formed in the faceplate 16 for receiving and containing an outer end portion of one or more bulkhead connectors such as the illustrated fiber optic bulkhead connectors 18,18. The bulkhead connectors are preferably mounted on the faceplate so that the outer ends of the connectors do not project beyond the frontal surface of the faceplate. It will now be apparent that the insert front wall 22 is inwardly offset from the frontal edges of the outlet box to accommodate the indentation 38.

As previously noted the faceplate assembly 10 is adapted to terminate electrical connectors as well as optical fibers and for this reason the faceplate 16 also carries the modular connector 19. The illustrated connector 19 comprises a modular jack received in snap-in engagement within an associated rectangular opening 40 formed in the faceplate 16 above the recess 38.

An end portion of a hybrid cable to be terminated enters the outlet box 12 through an aperture in the box formed by removing an associated knock-out portion of the box in a manner well known in the art. One or more axially elongated optical fibers exposed at the end of the cable enter the racetrack 26 through an associated slot 28. The end portion of each optical fiber is terminated by an associated optical fiber connector adapted for coupling to an associated bulkhead connector 18.

The faceplate 16 is removed from the outlet box and the optical fiber or fibers to be terminated by the faceplate are passed through the circular opening 27 and extended a convenient distance beyond the outlet box to enable the fiber optic connector associated with each optical fiber to be coupled to the inner end of an associated bulkhead connector 18 mounted on the faceplate without subjecting the optical fiber to excessive bending stress. The electrical conductors to be terminated are also exposed at the end of the cable, pass through the frontal opening in the outlet box 12 and extend beyond the outlet box a distance at least equal to the distance of extent of the optical fiber or fibers. However, the electrical conductors do not enter or pass through the racetrack 26. The electrical conductors are terminated in a conventional manner by the modular jack 19.

After both the optical fibers and electrical conductor terminations have been completed at the faceplate the optical fiber or fibers are fed into the bore 26 through the circular opening 27. The optical fiber or fibers will assume a coiled condition while being payed into the bore or racetrack 26 without being exposed to excessive bending stress. The electrical conductors being less subject to potential damage are preferably simultaneously stuffed into the outlet box with reasonable care and are stored in the space between the walls of the outlet box 12 and the walls of insert 14.

After each optical fiber has been safely stored in coiled condition within the racetrack 26 and the elongated end position of each electrical conductor is also positioned within the outlet box the faceplate is secured to the wall mounted outlet box and in engagement with the wall by the fasteners 37,37 which threadably engage with bosses 36,36.

I claim:

1. A fiber optic faceplate assembly for an outlet box having a frontal opening, said faceplate assembly comprising the faceplate, a fiber optic connector mounted in fixed position on said faceplate, and insert means for positioning within the outlet box and defining a forwardly extending cylindrical bore for receiving and storing in coiled condition an elongated portion of at least one optical fiber coupled to said fiber optic connector, said insert means having a front wall at the forward end of said bore including a frontal aperture therethrough communicating with said bore and through which the one optical fiber is payed into and out of said bore, said frontal aperture having a cross-sectional area smaller than the frontal cross-sectional area of said bore, means for releasably securing said insert within the outlet box and means for releasably attaching said faceplate to the outlet box to form a substantial closure for the frontal opening.

2. A fiber optic faceplate assembly for an outlet box as set forth in claim 1 wherein said fiber optic connector comprises a bulkhead connector extending through said faceplate and having connecting means at its opposite ends for coupling optical fibers thereto at opposite sides of said faceplate.

3. A fiber optic faceplate assembly for an outlet box as set forth in claim 1 including a modular electrical connector carried by and extending through said faceplate for terminating an electrical connector contained within the outlet box.

4. A fiber optic faceplate assembly for a wall outlet box having a frontal opening, said faceplate assembly comprising a faceplate, an optical fiber bulkhead connector carried by said faceplate, and an insert for positioning within the wall outlet box, said insert having a front wall and a bore defining portion extending rearwardly from said front wall and defining a generally cylindrical bore and a rear wall forming a closure for the rear end of said bore, said front wall having a circular opening therethrough communicating with said bore, means for releasably securing the insert in fixed position within the outlet box, and means for releasably securing the faceplate to the outlet box for separation from both the outlet box and said insert.

5. A fiber optic faceplate assembly for a wall outlet box as set forth in claim 4 wherein said circular opening has a diameter smaller than the diameter of said bore.

6. A fiber optic faceplate assembly as set forth in claim 4 wherein said faceplate has a frontal wall portion and another portion rearwardly offset from said front wall portion and said fiber optic connector is attached to said other portion.

7. The combination comprising a outlet box having a frontal opening, and a faceplate assembly attached to said outlet box and including a faceplate overlying the frontal opening in said outlet box and providing a substantial closure for said frontal opening, a fiber optic bulkhead connector attached to and extending through said faceplate, an insert received within said outlet box and having a front wall spaced rearwardly of said frontal opening and a bore defining portion extending rearwardly from said front wall and defining a cylindrical bore generally axially normal to said frontal opening, said bore defining portion having an opening therethrough communicating with the interior of said outlet box and said bore, said front wall having a circular opening therethrough communicating with the front end of said bore, means for releasably securing said insert to said outlet box, and means for releasably securing said faceplate to said insert.

8. The combination as set forth in claim 7 wherein said bore defining portion comprises a generally cylindrical tubular portion of said insert and said opening in said bore defining portion comprises a slot in said tubular portion.

9. A fiber optic faceplate assembly for an outlet box having a frontal opening, said faceplate assembly comprising the faceplate, a fiber optic connector mounted in fixed position on said faceplate, and insert means for positioning within the outlet box and defining a forwardly opening bore for receiving and storing in coiled condition an elongated portion of at least one optical fiber coupled to said fiber optic connector, a modular electrical connector carried by and extending through said faceplate for terminating an electrical connector contained within the outlet box, and means for releasably attaching said faceplate to said outlet box to form a substantial closure for the frontal opening.

10. A fiber optic faceplate assembly for an outlet box as set forth in claim 9 wherein said insert includes a front wall at the forward end of said bore having an aperture therethrough communicating with said bore and said aperture has a cross-sectional area substantially smaller than the frontal cross-sectional area of said bore.

11. A fiber optic faceplate assembly as set forth in claim 10 wherein said bore comprises a generally cylindrical bore and said aperture comprises a generally circular opening.

12. A fiber optic faceplate assembly for an outlet box as set forth in claim 11 wherein said circular aperture is generally coaxially aligned with said cylindrical bore.

13. A fiber optic faceplate assembly for an outlet box as set forth in claim 12 wherein said bore has at least a 3 inch diameter.

14. A fiber optic faceplate assembly for an outlet box having a frontal opening, said faceplate assembly comprising the faceplate, a fiber optic connector mounted in fixed position on said faceplate, and insert measn for positioning within the outlet box and defining an axially forwardly extending generally cylindrical bore for receiving and storing in coiled condition an elongated portion of at least one optical fiber coupled to said fiber optic connector, said insert means including a front wall having a circular aperture therethrough communicating with said bore and having a diameter smaller than the diameter of said bore, means for releasably securing said insert means in an outlet box such as aforesaid.

15. A fiber optic faceplate assembly for an outlet box as set forth in claim 14 wherein said circular aperture is generally coaxially aligned with said cylindrical bore.

* * * * *